United States Patent [19]
Chernov et al.

[11] 3,884,122
[45] May 20, 1975

[54] METAL-CUTTING MACHINE FOR MACHINING LOCATING SURFACES

[76] Inventors: Evgeny Alexandrovich Chernov, Lesnoi prospekt, 75, kv. 15, Leningrad; Arkady Nikolaevich Poletaev, ulitsa Kozlova, 35/1, kv. 112, Minsk; Saul Vulfovich Golod, ulitsa Bronnitskaya, 22, kv. 2; Evgeny Vasilievich Petrov, Prospekt Bolshevikov, 35/1, kv. 7, both of Leningrad; Dmitry Timofeevich Vasiliev, Zubovsky bulvar, 15, kv. 6, Moscow; Vitold Antonovich Tofpenets, ulitsa Klary Tsetkin, 24, kv. 3, Minsk, all of U.S.S.R.

[22] Filed: Nov. 8, 1972

[21] Appl. No.: 304,825

[52] U.S. Cl. ................. 90/58 C; 51/240 T; 269/81; 408/71
[51] Int. Cl. ............................................. B23q 3/00
[58] Field of Search ............ 408/89, 90, 70, 71, 91, 408/3; 90/58 C; 269/7, 81; 51/240 R, 240 T

[56] References Cited
UNITED STATES PATENTS
3,267,772    8/1966    Burg .................................... 408/91

*Primary Examiner*—Andrew R. Juhasz
*Assistant Examiner*—Z. R. Bilinsky

[57] ABSTRACT

A table carrying a workpiece being machined, is mounted on a base and has at least two degrees of freedom with respect thereto for an optimum positioning of the workpiece with respect to a cutting tool by way of at least two table orientation mechanisms.

For the positive locking of the table in the predetermined position with respect to the cutting tool, provision is made for a device comprising: an intermediate link "floating" in the base and adapted for a continuous sliding contact with the table surface facing the base in the course of the table orienting, and a means for a positive locking of said intermediate link simultaneously with the table and with the base during the course of cutting.

3 Claims, 6 Drawing Figures

METAL-CUTTING MACHINE FOR MACHINING LOCATING SURFACES

The present invention relates generally to metal-cutting machine-tools and has particular reference to metal-cutting machine-tools for machining locating surfaces.

The invention can find most utility when employed for machining locating surfaces of intricately shaped parts, such as turbine blades.

Of common knowledge are the requirements which are imposed upon the machining of locating surfaces of workpieces. An accurate arrangement of such surfaces with respect to other surfaces of workpiece is a prerequisite of its further machining, since it predetermines the conditions thereof (a sufficient amount of machining allowance and its uniformity over the entire surface to be machined). All this exerts a substantial influence upon the quality of the parts produced and upon their correct arrangement when assembled together in a finished article.

In this respect the optimum location of the workpiece with reference to the cutting tool when machining locating surfaces, becomes essential, especially for complicatedly shaped workpieces.

It is known to use prior-art cutting machines for machining locating surfaces, comprising a table for setting the workpiece being machined, the table being mounted on a base and having at least two degrees of freedom with respect thereto for effecting an optimum positioning workpiece with respect to the cutting tool by way of at least two table orientation mechanisms (whose number depends upon that of the degrees of freedom thereof), located on the base one upon the other so as to form a consecutive kinematic chain having a terminal link interconnected with the table, and a device for effecting positive table fixing in a predetermined position with respect to the cutting tool.

In the known machines, with a view to an optimum positioning of the workpiece with respect to the cutting tool, provision is made for two orientation mechanisms for the table carrying the workpiece during machining, which enable it to have two degrees of freedom, viz., reciprocation motion and rotation about its own axis.

One of the table orientation mechanisms is essentially a movable platform, while the other, a table turning mechanism.

Locked in place on the machine base are straight rolling-contact ways carrying a movable platform which bears circular rolling-contact ways, whereon the table turning mechanism is mounted.

Each orientation mechanism has its own device for positively fixing the table against the motion the mechanism is to impart thereto.

Consequently, in order to fix the selected (optimum) table position with respect to the cutting tool, in the known machines both devices for the positive fixing of the table should be brought into action (in case of two table orientation mechanisms).

The device for locking the table against translational motion of the platform along the base ways is made as follows.

Fixed between the ways is a T-shaped web whose stem protrudes over the ways.

The movable platform has a stepped boring to accommodate the drive shaft. The shaft is rotated by the operator owing to which some difficulties arise in the machine servicing. The shaft carries a pair of clamping jaws of which one is set on a threaded portion of the shaft and the other, on plain portion thereof. The pair of jaws clamps the protruding web stem when the shaft rotates, thus locking the table against translational motion.

The device for locking the table against rotation during the course of cutting is similar in design.

During the course of cutting process, each table fixing device of the known machines takes up cutting forces which extend either parallel with the straight ways of the platform or tangential to the circular ways of the table turning mechanism.

Those cutting forces that arise during the course of machining and are directed normally to the straight ways or radially to the circular ways, are not taken up by the table fixing devices, since the drive shaft carrying the jaws is mounted in one of the devices perpendicular to the straight ways and in the other device, radially to the circular ways. Thus, during the course of cutting, each of the shafts is free to move lengthwise of the own axis thereof, the amount of such motion depending upon the strains arising in the rolling-contact ways from the cutting forces.

Consequently, cutting forces directed either perpendicularly or radially to the respective ways, are taken up not by the table fixing devices but by the rolling-contact ways themselves, which are known to be generally incapable of taking up heavy loads. This fact tells extremely unfavourably on the table rigidity which, in turn, restricts the amount of machining allowance that can be removed, as well as reducing the accuracy and production output of the machine.

In the known machines the construction of the table fixing devices features the total rigidity of the table orientation mechanisms locked against movement (i.e., the rigidity of the table as a whole) decreases with the increase of the degrees of freedom. On account of low table rigidity, the known machines cannot be employed for mechanical treatment of workpieces involving high cutting forces, such as in case of milling the locating surfaces of workpieces with large (up to 7 mm) machining allowances.

Another disadvantage of the prior-art machine resides in the necessity for the accurate manufacture and playfree fitting of the parts of the table fixing device. For instance, if play is left between the mating surfaces of the drive shaft and the stepped boring in the platform, wherein it is accommodated, a possibility arises for an undesirable platform motion with respect to the base (or of the table with respect to the platform). With the table having numrous degrees of freedom, i.e., when numerous mechanisms for table orienting are involved (practically the table may have six degrees of freedom) the various plays are summed up and adversely affect the orientational accuracy of the workpiece being machined with respect to the cutting tool.

Thus, in the known machines the device for effecting a positive locking the table in the predetermined position with respect to the cutting tool incorporates such a number of the table fixing devices that depends upon the number of the degrees of freedom of the table, i.e., that of the table orientation mechanisms.

This fact considerably complicates the machine design, adversely affects its operational reliability and renders it inconvenient in service.

It is therefore an important object of the present invention to provide a metal-cutting machine for machining locating surfaces of workpieces, incorporating such a device for a positive locking of the table in an optimum position with respect to the cutting tool that will considerably simplify the machine design as compared to the known machines of the same type.

It is another important object of the present invention to provide a machine of the character set forth hereinbefore that is reliable in operation and convenient in service.

These and other objects are accomplished in such a metal-cutting machine wherein, according to the invention, the device for effecting positive table locking in a predetermined position with respect to the cutting tool incorporates an intermediate link "floating" in the base and which is adapted to be in a continuous sliding contact with the table surface that faces the base during the course of the table orientation with respect to the cutting tool, and including means for a positive connection of the intermediate link to the table and to the base at any time during the course of the cutting process.

Such an embodiment of the device for the table positive locking in the course of cutting considerably simplifies the design of the inventive machine, makes its operation reliable and provides convenience in servicing of the machine.

It is extremely advantageous that at least two opposite table sides on the surface facing the base have T-shaped shoulders, while the base is provided with the respective depressions or recesses for the shoulders so as to be freely accommodated therein, adapted to be filled with a medium capable of being during a liquid state in the course of table orientation with respect to the cutting tool, and in a solid state so as to firmly engage the base and at the same time to rigidly embrace the table shoulders during the course of the cutting process.

Such a constructional embodiment of the device ensures a high degree of rigidity of the table in the course of cutting at a high accuracy of the table fixing in the predetermined position with respect to the cutting tool.

It is expedient that use be made of low-melting Wood's alloy as a medium for filling the recess in the base.

It is also possible that water be used as the medium.

Both Wood's alloy and water are capable of expanding when solidifying. The use of said feature is favourable to provide a positive locking of the table of the proposed metal-cutting table in the course of cutting.

It is highly advantageous that the base be provided with channels located proximate the contour of each said recess and adapted to be alternatively communicated with a source of heat or of cold during the course of the table orientation and during the cutting process, respectively.

It is practicable that provision be made on the table surface facing the base, for a T-shaped shoulder located along the entire table periphery, with the respective recess in the base being in this case made as a circular groove.

Such a constructional feature ensures high table rigidity during the course of cutting and, besides, provides for favourable conditions for protection of the table orientation mechanisms against the ingress of dust or cutting emulsion.

It is preferable that the portion of the shoulder which faces the bottom of the recess in the base and the bottom of said recess be coated with a layer of an elastic material capable of compensating for the deformation of the medium filling the recess that is liable to arise during the medium solidification.

It is also advantageous for attaining the objects of the invention, that the intermediate link be made essentially as a pair of T-shaped beams, the vertical stem of each of the beams during the course of the table orienting being in a continuous sliding contact with the butt-end surface of the base through the action of a spring-loaded plate provided on the base, and being positively forced against the surface during the cutting process, while on the flange of each of the beams an insert having a cylindrical recess is so located that the recess faces the surface of the table which carries cylindrical pins located on the table opposite sides in a correspondence with the beams and in parallel with the base, the pins with their lower portions entering said cylindrical recesses with a possibility of being in a continuous sliding contact therewith in the course of the table orienting; the upper portions of the pins carrying rockers which bear spring-loaded plates adapted to positively force the beam flanges through the inserts against the respective table pins during the course of cutting.

Such a constructional feature ensures quick action of the device for positive locking of the table.

Positive forcing of the vertical stem of each T-shaped beam against the butt surface of the base, and that of the flange of said beams through the insert against the table pin is effected by means of diaphragm-actuated hydraulic clamps mounted on the respective plates.

The surfaces of the T-shaped beams and of the inserts which are in a continuous sliding contact with each other and with the respective base and table surfaces in the course of the table orienting, are provided with grooves adapted to form together with the surfaces of the mating surfaces leakproof channels communicating with the source of pressure-fed oil.

Such a constructional feature is conducive to practically minimizing forces of friction on the sliding surfaces of the mating parts and ensures a high accuracy of positioning the table carrying the workpiece during machining with respect to the cutting tool.

Thus, the proposed metal-cutting machine, due to a simple constructional embodiment of the device for effecting a positive table locking in a predetermined position with respect to the cutting tool, ensures high table rigidity during the cutting process, features reliability in operation and convenience in servicing.

The invention will be more apparent from the following description of an exemplary embodiment thereof, reference being made to the accompanying drawings, wherein.

Figure 1:
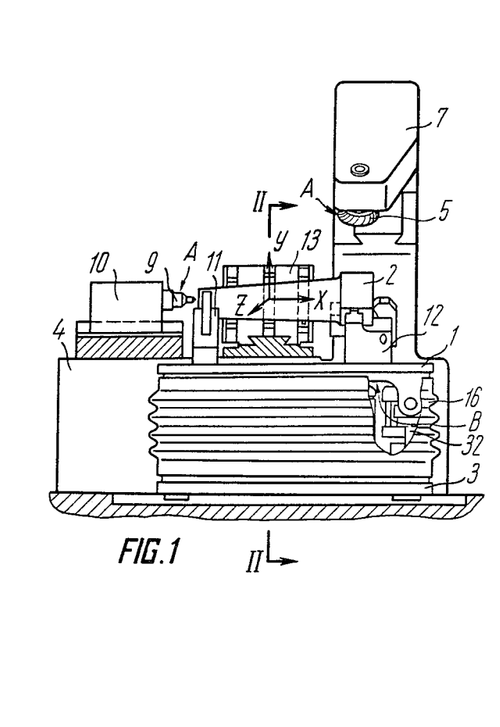
FIG. 1 is a general diagrammatic view of a metal-cutting machine, according to the invention showing the table orientation mechanisms covered with protective bellows, with a portion thereof broken away.
Figure 2:
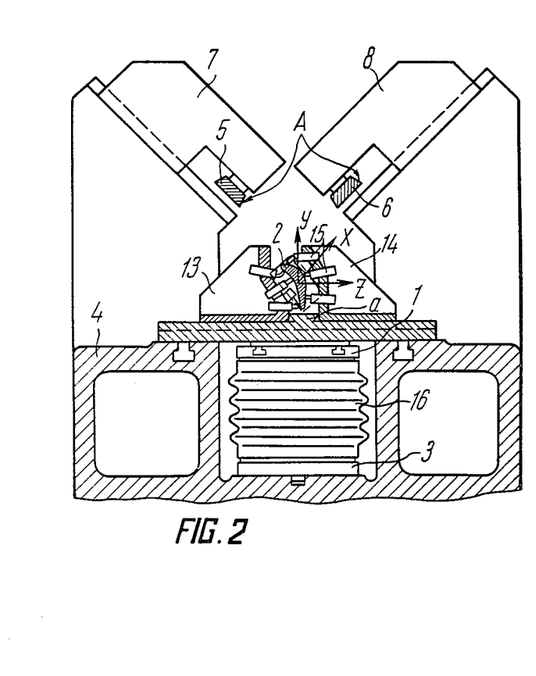
FIG. 2 is a section taken along the line II — II of FIG. 1.

Now referring to FIGS. 1 and 2, the proposed metal-cutting machine for machining locating surfaces comprises a table 1 for accommodating a workpiece 2 during machining, said table being mounted on a base 3 so as to have at least two degrees of freedom with respect thereto for an optimum positioning of the workpiece 2 with respect to a cutting tool A by means of at least two table orientation mechanisms, determined by the number of the degrees of freedom of the table, the mechanisms being located on the base one upon the other so as to form a consecutive kinematic chain having the terminal link interconnected with the table, and a device for positively locking the table 1 in a predetermined position with respect to the cutting tool A.

According to the invention, the device for the table positive locking comprises an intermediate link "floating" in the base 3 and adapted for a continuous sliding contact with a surface B of the table 1 facing the base 3 during the course of the table orienting with respect to the cutting tool A, and means for positively connecting the intermediate link simultaneously to the table 1 and to the base 3 during the course of cutting.

The base 3 is located on a bed 4 of the machine. In the herein-considered specific embodiment of the invention the workpiece 2 being machined is in fact a turbine blade, wherein subject to machining as locating surfaces are two mutually perpendicular surfaces on the root and the central tapered hole at the blade end opposite to the root.

As the cutting tool A, use is made of milling cutters 5 and 6 which are respectively located on milling heads 7 and 8 which are mounted by a conventional way on the bed 4, and a drill 9 held in a drill head 10 which is similarly mounted on the bed 4.

The turbine blade 2 is clamped on the table 1 by means of clamping fixtures 11 and 12. The bed 4 mounts actuated holders 13 and 14 for a blade position sensor 15.

In the herein-considered embodiment of the invention, the table 1 has five degrees of freedom with respect to the base 3 due to the provision of five table orientation mechanisms. In FIGS. 1 and 2 these mechanisms are covered with bellows 16 protecting them from the ingress of alien bodies, such as metallic chips or cutting fluid.

Figure 3:
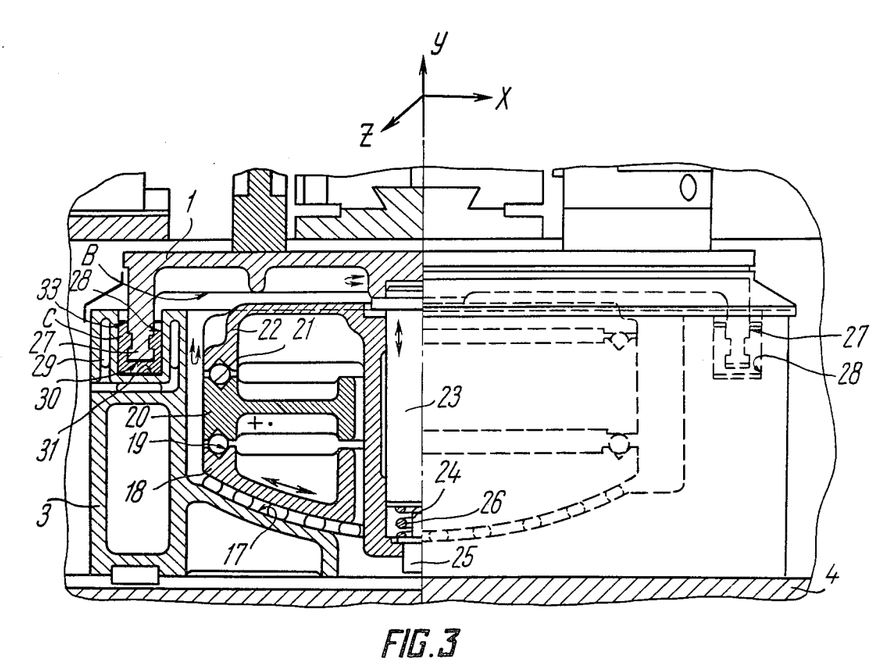
FIG. 3 illustrates the mutual arrangement of the table orientation mechanisms and the device for positively locking the table during the course of cutting, according to one of the embodiments of the present invention, with a fragmentarily cut-away view taken along the longitudinal plane of symmetry of the machine.
Figure 4:
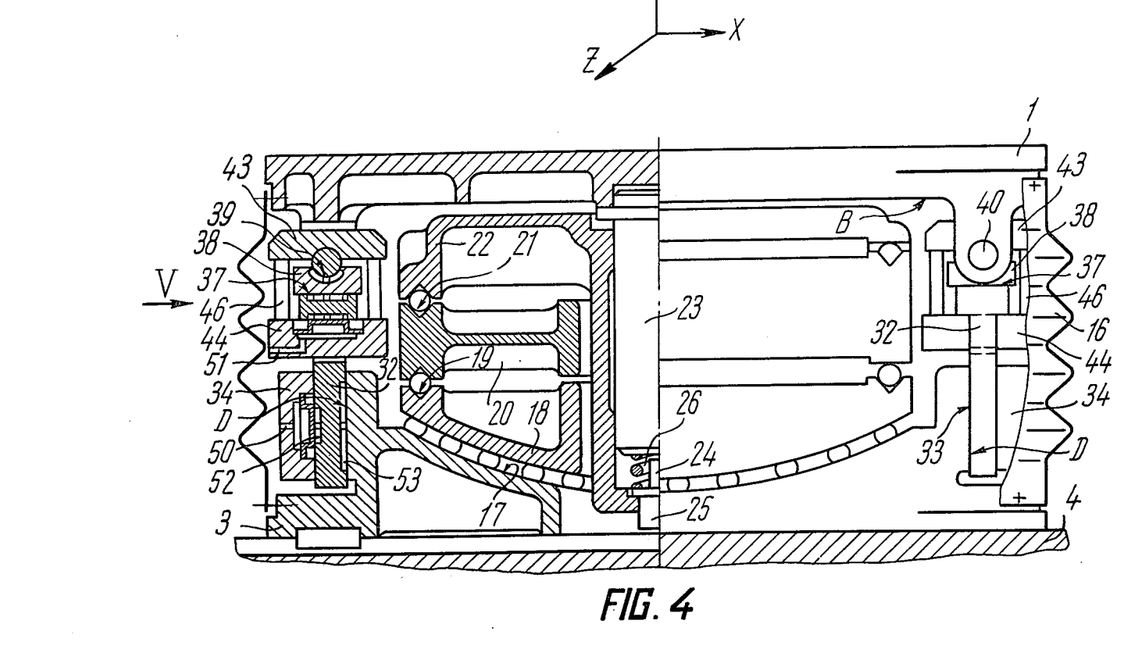
FIG. 4 illustrates the mutual arrangement of the table orientation mechanisms and the device for positive locking thereof during the course of cutting, according to another embodiment of the present invention, with a fragmenarily cut-away view taken along the longitudinal plane of symmetry of the machine and with another portion of the protective bellows broken away.

For the sake of clarity in further details concerned with the table orientation mechanisms, the axes XYZ of coordinates are presented in FIGS. 3 and 4.

The base 3 has arcuate rolling-contact ways 17 whose axis coincides with the axis Z of the coordinates. The ways mount a rocking bar 18 which carries a streight rolling-contact ways 19 arranged in parallel to the axis Z of the coordinates and mounting a slide block 20. The latter is provided with arcuate rolling-contact ways 21 whose axis coincides with the X of coordinates and wherein a cradle 22 is mounted. In the central portion of the cradle 22 a cylindrical cavity is provided length-wise the axis Y of the coordinates, wherein a rod 23 is accommodated which with one of its ends is fixed in position on the surface B of the table 1, and with the other end rests against a rod 24 of a drive 25 to impart translational motion to the table 1 length-wise the axis Y, and against a relief spring 26, both the rod and the spring being located at the bottom of the cradle cylindrical cavity.

Thus, the table 1 has five degrees of freedom with respect to the axes XYZ of coordinates, viz., translational motion along the axes Z and Y effected respectively through the slide block 20 and the rod 23; rotary motion about the axes Z, X and Y carried out respectively through the rocking bar 18, the cradle 22 and the rod 23. The drives of all the five table motions are self-contained ones and are not shown in the appended drawings (except for the drive 25) with a view not to obscure the essence of the invention, and to sophisticate the drawings.

The extent of each of the travels of the table 1 is substantially proximate to the amount of the distributed machining allowance on the workpiece being machined.

According to the invention, two opposite sides of the table 1 (FIG. 3) have T-shaped shoulders 27 located on the surface B facing the base 3, whereas the latter is provided with respective recesses 28 for a free accommodation of said shoulders and for filling with a medium C capable of being in a liquid state during the table orienting with respect to the cutting tool, and in a solid state so as to firmly engage the base 3 and at the same time to rigidly embrace the shoulders 27 of the table 1 during the course of cutting.

The T-shaped shoulder may be made, according to the invention, along the entire periphery of the table 1 on its surface B, and the recess in the base 3 corresponding to such a shoulder in this case is made as a circular groove.

Such a constructional feature ensures a high degree of rigidity of the table that carries the workpiece during machining, and during the course of cutting.

Additionally, in such case favourable conditions are established for protection of the table orientation mechanisms against ingress of dust, chips or cutting fluid thereinto without the use of any additional guards.

According to the invention, the medium C for filling the recess 28 in the base 3 is expediently low-melting Wood's alloy.

Water is likewise expediently used as the medium C. Both Wood's alloy and water being capable of expanding upon solidifying, they firmly engage the base and embrace the shoulders, i.e., are positively locked-in with both the same and the table, which is highly advantageous to ensure rather high table rigidity during the course of cutting.

According to the invention, channels 29 are provided in the base 3 proximate the contour of the recess 28, the channels being adapted to alternatively communicate with the source of heat or of cold during the course of orientation of the table 1 and during the cutting process, respectively.

It is preferable that a portion 30 of the shoulder 27 which faces the bottom of the recess 28 in the base 3, and the bottom of the recess be coated with a layer 31 of an elastic material capable of compensating for the deformation of the medium filling the recess arising during the course of its solidification, so as to preclude any displacement of the table with respect to the base at the moment of a positive locking therof in a predetermined position with respect to the cutting tool. Spongy rubber may satisfactorily serve as such a material.

The proposed metal-cutting machine operates as follows.

Prior to starting the operation of the machine, the latter is to be set up and adjusted as against the master pattern which substantially imitates the workpiece 2, viz., turbine blade machined on the machine. To this end, the master pattern is set on the table 1 and clamped in the clamping fixtures 11 and 12 (FIG. 1). All the table orientation mechanisms are set in their middle positions so that each of the mechanisms are thus capable of imparting to the table 1 motion in both directions away from its central position.

In such a selected position the table 1 is positively locked with respect to the base 3. To this end theh channels 29 (FIG. 3) are made up so as to communicate with the source of cold, with the result that Wood's alloy (or water) confined in the recesses 28, solidifies (gets crystallized), thus firmly holding the base 3 and simultaneously embracing the shoulders 27.

Further, the cutting tool A (FIGS. 1 and 2), viz., the milling cutters 5, 6 and the drill 9 are brought towards the locating surfaces to be machined, the position of the cutting tools being fixed upon coming into contact with the locating surfaces.

Moved then toward to those surfaces of the master pattern on which the imitated workpiece is to have a uniform allowance for subsequent machining, are the position sensors 15, this being effected by means of actuated holders 13 and 14 (FIG. 2) resting against the appropriate faces of the projection *a* (the latter is provided on the machine stationary member). The tracers of the sensors 15 are set in their central position which is fixed either visually by the operator or is remembered by any of presently known electronic control systems suitable for the purpose.

Thereupon the sensors 15 are retracted, and the master pattern is released from the clamping fixtures, whereupon the workpiece to be machined, viz., the turbine blade 2, is set instead of the master pattern, and the sensors 15 are approached to the appropriate surfaces thereof. With the sensor holders 13 and 14 resting against the respective faces of the projection *a* the sensor tracers assume the positions corresponding to the amount of machining allowance at every point to be checked on the surfaces of the workpiece 2.

This done, the channels 29 (FIG. 3) are made to communicate with the source of heat, and the medium C contained in the recesses 28 of the base 3 melts, with the result that the shoulders 27 get "released" and the table 1 is rendered free to be imparted motions transmitted thereto by the orientation mechanisms, with respect to the base 3.

To provide as uniform distribution of the allowance at the points of the turbine blade being checked as positive, i.e., to approximate, as far as the actual shape of the given specific turbine blade permits, the readings of the sensors 15 to a single value; these initial readings that hold true for the given particular turbine blade are evaluated by the operator (or the machine electronic control system) by comparing with the readings of same sensors 15 taken when their traces assumes the central position while in touch with the checked surfaces of the master pattern.

The initial readings of the sensors 15 which are effective for the given blade, are compared with each other.

As a result of the procedure discussed above, a decision is made to shift the blade 2 in some direction or other with respect to the axes XYZ of coordinates. Then the command signals are delivered to the drives of the respective table orientation mechanisms to move the table appropriately.

In order to turn the blade 2 about the axis Z, the rocking bar 18 is traversed along the arcuate ways 17. Along with the rocking bar 18, also the slide block 20, the cradle 22 with the rod 23 carrying the table 1 together with the blade 2 fixed thereon by means of the clamping fixtures 11 and 12, are turned about the axis Z. To move the blade 2 along the axis Z, the slide block 20 is traversed along the straight ways 19. When the cradle 22 travels along the arcuate ways 21 the blade 2 turns around the axis X. To move the blade upwards or downwards along the axis Y, the rod 23 serves which is imparted translational motion parallel to the axis Y of coordinate, this motion being transmitted thereto from the drive 25 via the rod 24. To facilitate the work of the drive 25, the spring 26 is provided to counterbalance part of the mass of the rod carrying the table 1 and the other related parts. To turn the blade 2 round the axis Y use is made of another drive (not shown) by means of which the table 1 along with the blade 2 clamped thereon, turns on the rod 23 whose axis coincides with the axis Y of coordinates.

When the optimum position for the blade 2 is determined, the table 1 is positively locked in that position, for which purpose the channels 29 get communicated with the source of cold. As a result of cooling the medium C contained in the recesses 28 congeals (gets crystallized) to firmly hold the base 3 and embrace the T-shaped shoulders 27 of the table, thus dependadly precluding any displacement of the table 1 with respect to the base 3.

In order to prevent the shoulder 27 from being "squeezed out" from the recesses 28 under the effect of forces developed from the expansion of Wood's alloy (or water) at the moment it gets crystallized attempts are made to mutually counterbalance said forces. The layers 31 of an elastic material that coat the butt surface of the shoulder and the bottom of the recess, are capable of taking up the strain of the medium C filling the recess, arising at the moment of its crystallization, thereby precluding the effect of said forces upon the butt surface of the shoulder and upon the bottom of the recess. Those forces that acts upon the other "wetted" surfaces of the shoulder and base, are distributed symmetrically relative to the geometrical axis of the shoulder and thus are mutually balanced.

The T-shape is imparted to the shoulder 27 of the table with a view to preventing its escaping from the medium upon coagulation of the latter in the recess 28.

In order to isolate Wood's alloy from the atmosphere and prevent its undesirable oxidation (or to preclude water evaporation) use is made of an insulating oil layer covering the surface of the medium C filling the recess 28 in the base 3.

Further operation of the machine occurs in a way well known to those skilled of in the art and consists in that, after the table 1 has been positively locked in place, the locating surfaces on the blade root are machined in succession, while simultaneously the central hole is drilled at the blade end opposite to the root.

In the proposed machine the devices for table positive locking with respect to the cutting tool, due to the positive connection of the table 1 to the base 3, ensure high accuracy of fixing the table 1 along with the workpiece 2 with respect to the cutting tool A and high ridigity of the table 1, with the cutting forces acting upon the workpiece being machined, applied to the table 1 and therefrom to the base 3. Since the table and base are sufficiently rigid, the cutting forces are not taken up by the precision parts of the table orientation mechanisms, which contributes to the reliability and durability of the machine.

All this ensures high productivity of the machine and high accuracy in optimization of the position of the workpiece surfaces under control with respect to its locating surfaces machined on the proposed machine. Besides, a reasonably large amount of the machining allowance and its uniform distribution over all the workpiece surfaces that are machined subsequently are guaranteed which, in turn, provides for substantially high quality of parts manufactured and their correct positioning in the assembled article.

In the proposed machine the device for a positive locking of the table 1 in a predetermined position with respect to the cutting tool A may be made, according to the invention, as follows.

The intermediate link is made essentially as a pair of the T-shaped beams 32 (FIG. 4) the vertical portion 33 (stem) of each of the beams, during the orientation of the table 1, being in a continuous sliding contact with the butt surface D of the base 3 by way of the spring-loaded plate 34 (FIGS. 4, 5, 6) mounted on the base, and is positively forced against said surface in the course of cutting.

Sliding contact of the stem 33 with the butt surface D of the base 3 is attained due to the fact that the plate 34 has stepped recesses, each of which accommodate the spring 35 (FIG. 6) loaded by the screw 36 (FIGS. 5 and 6), which is free to pass through the hole in the beam stem and is turned-in into the butt surface D of the base 3 so that the clearance E (FIG. 6) is left in between the screw head and the plate. By taking up this clearance, a positive locking of the stem 33 of the beam 32 with the base 3 is carried out.

Located on the horizontal portion 37 (FIGS. 4, 5, 6) (flange) of each beam is the insert 38 having the cylindrical recess 39 so that said recess faces the surface B (FIGS. 4 and 5) of the table 1, wherein the cylindrical pins 40 are held on the opposite sides thereof respectively to the beams and parallel to the base 3, said pins with their bottom portions 41 (FIG. 6) being accommodated in said recesses of the inserts with a possibility of a continuous sliding contact therewith in the course of the table orientation. The top portions 42 of the pins mount the rockers 43 (FIGS. 4, 5, 6) carrying the spring-loaded plates 44 which are freely accommodated in ports made in the beams beneath their flanges 37, and adapted to positively force the flanges through the inserts 38 against the respective pins 40 of the table 1 during the cource of cutting.

The insert 38 is during a direct sliding contact (in the course of the table orientation) by its bottom surface, with the beam flange 37, and by the surface of the cylindrical recess, with the bottom portion 41 of the pin 40.

Sliding contact of the flange 37 of each beam 32 through the insert 38 with the bottom portion 41 of the pin 40 is attained due to the fact that the plate 44 has hollows, each of which accommodate the spring 45 (FIG. 6), loaded by the screw 46 (FIGS. 4, 5, 6) which is rotated into the rocker 43 on the side facing the base 3 so that the clearance G is left between the screw head and the plate. By taking up this clearance, a positive connection of the flange 37 of the beam 32 to the table 1 is attained.

According to the invention, a positive forcing of the stem 33 of each T-shaped beam 32 against the butt surface D of the base 3, and of the flange 37 of the beams through the insert 38 against the pin 40 is effected through the use of the diaphragm-actuated hydraulic clamps 47 and 48 (FIG. 6) mounted on the respective plates 34 and 44.

Each of the hydraulic clamps 47 and 48 is formed by the dish-shaped metallic diaphragm 49 adapted to tightly close the respective boring made in the plates 34 and 44 on the side facing, respectively, the stem 33 and the flange 37 of the beam, thus establishing leakproof spaces communicating with the source of pressure through the channels 50 and 51 (FIG. 4).

It is expedient for establishing favourable conditions for the operation of the parts of the device for the positive locking of the table being effected in its optimum position with respect to the cutting tool, that the grooves 52, 53 (FIG. 4), 54, 55, 56 (FIGS. 5 and 6) be made on the surfaces of the beams 32 (FIG. 6) and of their inserts 38 that are in a continuous sliding contact with each other during the table orientation and with the respective surfaces of the base and table, with the grooves forming together with the surfaces of the mating parts a number of leakproof channels. These channels are communicated with the source of oil which is force-feed via the channels 57 and 58 (FIG. 5).

Figure 5:
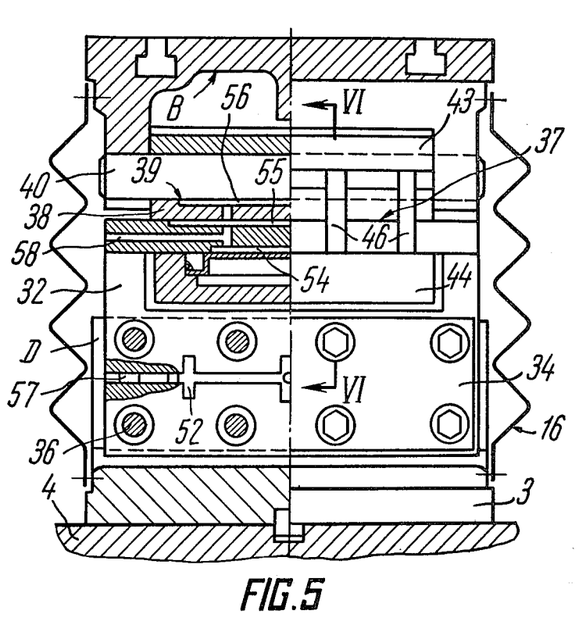
FIG. 5 is the table positive locking device of FIG. 1 as viewed from the butt end of the metal-cutting machine of the invention, with a fragmentarily cut-away view taken along the plane of symmetry.
Figure 6:
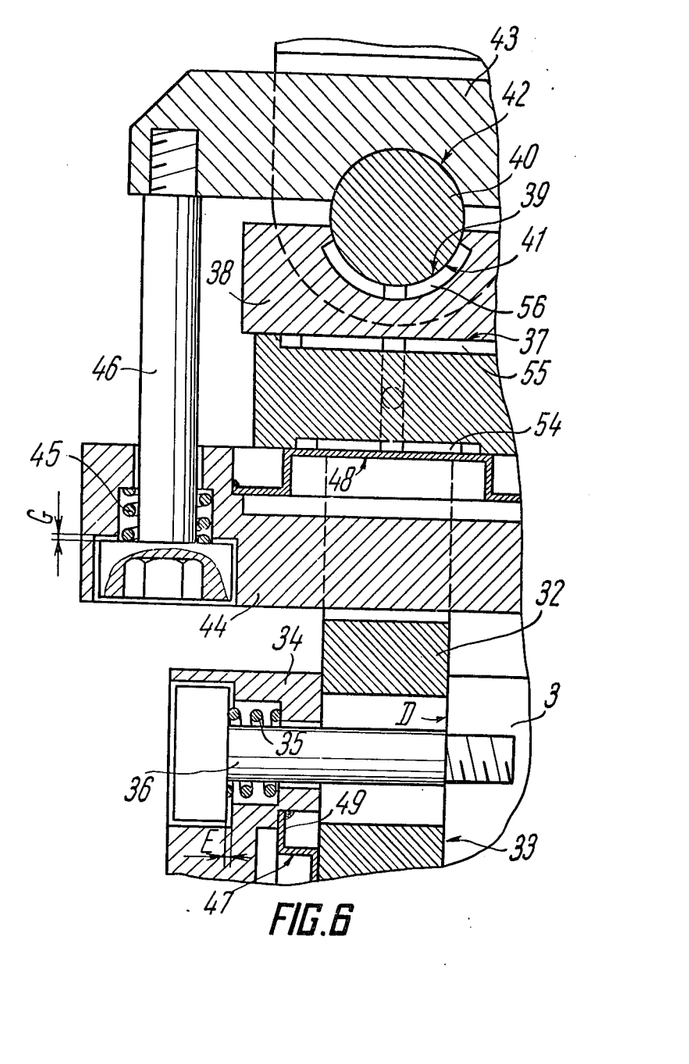
FIG. 6 is an enlarged-scale sectional view taken along the line VI—VI of FIG. 5.

Considering now further only the functioning of the device illustrated in FIGS. 4, 5, 6, since the operation of the machine itself is similar to that discussed above.

During the course of positioning the table carrying the workpiece 2 with respect to the cutting tool A, the table orientation mechanisms, as it has been pointed out hereinbefore, receive respective motions from their own drives. In this case no excess pressure occurs in the chambers of the hydraulic clamps 47 and 48, i.e., the clearances E and G (FIG. 6) are not taken up.

During the cource of the table orientation, oil is force fed along the channels 57 and 58, with the result that oil "pads" are formed in the grooves 52, 53, 54, 55 and 56, which substantially reduce the magnitude of friction forces effective on the surfaces of the beam 32 in a continuous sliding contact with the respective surfaces of the base 3, the insert 38, the plate 34 and 44, and on the surface 39 of the insert 38 that slide over the surface of the bottom portion 41 of the pin 40.

When the rocking bar 18 (FIG. 4) moves along the arcuate ways 17, the beam 32 performs vertical translational motion along the butt surface D (FIG. 6) of the base. As a result the pin 40 moves along with the table 1 about an arc having the pivotal centre thereof lying on the axis Z of the coordinates, thus entraining the insert 38, which slides over the surface of the flange of the beam 32 and at the same time turns about the geometrical axis of the pin 40. The rocker 43 carrying on its screws 46 the plate 44 which is continuously forced by the springs 45 against the back side (i.e., that facing the base) of the flange 37 of the beam 32, is likewise turned about this geometrical axis of the pin 40.

With the slide block 20 (FIG. 4) travelling along the straight ways 19, the beam 32 (FIG. 6) slips over the surface D of the base, while moving translationally in parallel therewith.

With the cradle 22 (FIG. 4) travelling along the arcuate ways 21, the beam 32 (FIG. 6) slips over the surface D of the base, while rotating about the axis X.

With the table 1 performing translational motion on the rod 23 along the axis Y of acoordinates under the action of the drive 25, the beam 32 performs vertical translational motion, while sliding over the surface D of the base.

With the table 1 turning on the rod 23 about the axis Y, the beam 32 performs translational motion parallel to the base, while sliding over the surface D of the base. At the same time the pin 40 along with the table 1 describes an arc whose pivotal centre lies on the axis Y. While so moving, the pin entrains the insert 38 so as to perform a rotary motion on the surface of the flange 37 of the beam 32, the latter of which moves translationally.

Thus, the above-considered device for effecting the table positive locking does not impede any motion imparted to the table by the mechanisms for its orientation, while its intermediate link "floating" in the base, viz., a pair of the T-shaped beams 32 is in a continuous sliding contact both with the table 1 and with the base 3.

In order to positively fix the table 1 in a predetermined optimum position with respect to the cutting tool A, the feed of oil along the channels 52, 53, 54, 55 and 56 is terminated, and a pressure is established in the chambers of the hydraulic clamps 47 and 48 by communicating the latter with the source of pressure via the channels 50 and 51. The metallic diaphragm 49 are "bulges" outwards to take up the clearances E and G, thus making the plates 34 and 44 heavily bear against the respective heads of the screw 36 and 46 (with a force of scores of tons) and forcing respectively the stem 33 of the beam 32 against the surface D of the base, and the flange 37 via the insert 38 against the bottom portion 41 of the pin 40, while at the same time resting with the rocker 43 against the top portion 42 of the pin 40.

As a result of such forcing of the stem 33 and the flange 37 of the beam 32, the required frictional resistance is established with respect to the movement of the table 1 relative to the base 3 which might arise due to the effect of the cutting forces during the course of the workpiece machining.

The use of diaphragm-actuated hydraulic clamps makes it possible to reliably ensure a simultaneous forcing of the stem and flange of the beam 32 against the respective surfaces of the base and table, at the same time attaining a minimum table displacement relative to the base due to an appropriately selected thickness of the metallic diaphragm 49.

Such a constructional feature adopted in the proposed machine ensures high-speed action, precision accuracy of the table locking in a predetermined position with respect to the cutting tool, high rigidity of the table-to-base connection in the course of cutting which, in turn, provides for high reliability of the machine in operation and convenience in its servicing.

All this renders fevourable conditions for obtaining machined workpieces with an optimum positioning of their locating surfaces with respect to the surfaces subject to subsequent machining.

It is especially worth noting that the proposed machine may be effectively employed for machining locating surfaces of intricate-shape workpieces having a minimum possible machining allowance (down to 0.3 mm) on curvilinear surfaces subject to further machining.

What is claimed is:

1. A metal-cutting machine for machining locating surfaces, comprising: a bed; a base mounted on said bed; a table for accommodating the workpiece under machining, said table being mounted on said base and having at least two degrees of freedom with respect thereto for an optimum positioning of said workpiece with respect to the cutting tool; a means carrying said cutting tool, mounted on said bed of the machine; at least two table orientation mechanisms whose number depends upon the number of the degrees of freedom of the table, said mechanisms being arranged one upon the other to form a common kinematic chain having the terminal link interconnected with said table carrying the workpiece being machined; a device for a positive locking of said table in a predetermined position with respect to said cutting tool, including an intermediate link "floating" in said base and adapted for a continuous sliding contact with the surface of said table facing said base in the course of the table orienting with respect to said cutting tool; said intermediate link being made as a pair of T-shaped beams, the vertical portion of each of said beams being, during the orientation of said table, in a continuous sliding contact with the butt surface of the base by means of a spring-loaded plate mounted on said base, and being positively forced against said surface in the course of cutting, whereas on the horizontal portion of each of said beams there is located an insert having a cylindrical recess, said insert being so arranged that said recess faces the table surface, said table having cylindrical pins located on its opposite sides respectively to said beams and parallel to said base, said pins with their bottom portions being accommodated in said recesses so as to be in a continuous sliding contact therewith during the table orienting, while the top portions of said pins mount rockers carrying spring-loaded plates which are adapted to positively force the flanges of said beams through said inserts against the respective of the said table pins in the course of cutting; and means for positively locking said intermediate link simultaneously with said table and said base during the course of cutting.

2. A metal-cutting machine as claimed in claim 1, wherein the stem of each T-shaped beam is positively forced against the butt surface of the base and the flange of each T-shaped beam is positively forced through the insert against the pin by virtue of diaphragm-actuated hydraulic clamps mounted on the respective of said plates.

3. A metal-cutting machine as claimed in claim 1, wherein grooves are made on the surfaces of the T-shaped beams and of the inserts which in the course of the table orienting are in a continuous sliding contact with each other and with the respective surfaces of the base and table; said grooves forming together with the surfaces of the mating parts a number of leakproof channels; said channel being adapted to communicate with the source of oil force-feed.

* * * * *